United States Patent
Laaksonen et al.

(10) Patent No.: US 11,244,659 B2
(45) Date of Patent: Feb. 8, 2022

(54) RENDERING MEDIATED REALITY CONTENT

(71) Applicant: Nokia Technologies Oy, Espoo (FI)

(72) Inventors: Lasse Laaksonen, Tampere (FI); Anssi Rämö, Tampere (FI); Arto Lehtiniemi, Lempaala (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 105 days.

(21) Appl. No.: 16/613,892

(22) PCT Filed: May 21, 2018

(86) PCT No.: PCT/FI2018/050381
§ 371 (c)(1),
(2) Date: Nov. 15, 2019

(87) PCT Pub. No.: WO2018/224725
PCT Pub. Date: Dec. 13, 2018

(65) Prior Publication Data
US 2020/0143775 A1     May 7, 2020

(30) Foreign Application Priority Data
Jun. 6, 2017 (EP) .................................... 17174540

(51) Int. Cl.
*G09G 5/38* (2006.01)
*G09G 5/373* (2006.01)

(52) U.S. Cl.
CPC ............... *G09G 5/38* (2013.01); *G09G 5/373* (2013.01); *G09G 2340/045* (2013.01);
(Continued)

(58) Field of Classification Search
CPC .... G09G 5/38; G09G 5/373; G09G 2340/045; G09G 2340/0464; G09G 2340/0492; G09G 2354/00
See application file for complete search history.

(56) References Cited

U.S. PATENT DOCUMENTS

2012/0113223 A1   5/2012   Hilliges et al.
2013/0120365 A1   5/2013   Lee et al.
(Continued)

FOREIGN PATENT DOCUMENTS

EP         3128413 A1    2/2017
JP    2006-293605 A   10/2006
(Continued)

OTHER PUBLICATIONS

Office action received for corresponding Japanese Patent Application No. 2019-566644, dated Jan. 25, 2021, 7 pages of office action and 5 pages of Translation available.
(Continued)

*Primary Examiner* — Abderrahim Merouan
(74) *Attorney, Agent, or Firm* — Alston & Bird LLP

(57) ABSTRACT

A method apparatus, and computer program, the method comprising: storing mediated reality content and associated information relating to a first real space in which the mediated reality content has been displayed; selecting the mediated reality content for display in a second real space; obtaining information relating to the second real space; and using the information relating to the first real space and the information relating to the second real space to adapt the mediated reality content for display in the second real space.

18 Claims, 7 Drawing Sheets

(52) U.S. Cl.
 CPC ............... *G09G 2340/0464* (2013.01); *G09G 2340/0492* (2013.01); *G09G 2354/00* (2013.01)

(56) References Cited

U.S. PATENT DOCUMENTS

| | | | |
|---|---|---|---|
| 2013/0286004 A1* | 10/2013 | McCulloch | G06T 19/006 345/419 |
| 2014/0049559 A1* | 2/2014 | Fleck | G06T 19/006 345/633 |
| 2014/0292807 A1 | 10/2014 | Raffa et al. | |
| 2014/0292809 A1* | 10/2014 | Tsurumi | G06F 3/04815 345/633 |
| 2014/0306996 A1 | 10/2014 | Cao et al. | |
| 2015/0187108 A1* | 7/2015 | Mullins | G06T 11/60 345/633 |
| 2016/0027213 A1 | 1/2016 | Burns et al. | |
| 2016/0041391 A1 | 2/2016 | Van Curen et al. | |
| 2016/0350973 A1 | 12/2016 | Shapira et al. | |
| 2017/0068323 A1 | 3/2017 | West et al. | |
| 2017/0150136 A1 | 5/2017 | Ueno et al. | |
| 2020/0410763 A1* | 12/2020 | Hare | G06T 19/006 |

FOREIGN PATENT DOCUMENTS

| | | |
|---|---|---|
| JP | 2014-197317 A | 10/2014 |
| JP | 2016-071900 A | 5/2016 |
| JP | 2018106298 A | 7/2018 |
| WO | 2014/119097 A1 | 8/2014 |
| WO | 2017/021587 A1 | 2/2017 |

OTHER PUBLICATIONS

Office action received for corresponding European Patent Application No. 17174540.9, dated Aug. 18, 2020, 4 pages.
Office action received for corresponding European Patent Application No. 17174540.9, dated Mar. 31, 2021, 5 pages.
"Sony's 'Joshua Bell VR Experience' on PSVR is Among the Best VR Video You'll Find on Any Headset", RoadTovr, Retrieved on Nov. 13, 2019, Webpage available at: https://www.roadtovr.com/now-psvr-sonys-joshua-bell-vr-experience-among-best-vr-video-youll-find-headset/.
Extended European Search Report received for corresponding European Patent Application No. 17174540.9, dated Dec. 12, 2017, 7 pages.
International Search Report and Written Opinion received for corresponding Patent Cooperation Treaty Application No. PCT/FI2018/050381, dated Jul. 30, 2018, 12 pages.
Office action received for corresponding Japanese Patent Application No. 2019-566644, dated Jun. 23, 2021, 6 pages of office action and 6 pages of Translation available.
Decision to Grant for Japanese Application No. 2019-566644 dated Nov. 9, 2021, 5 pages.

* cited by examiner

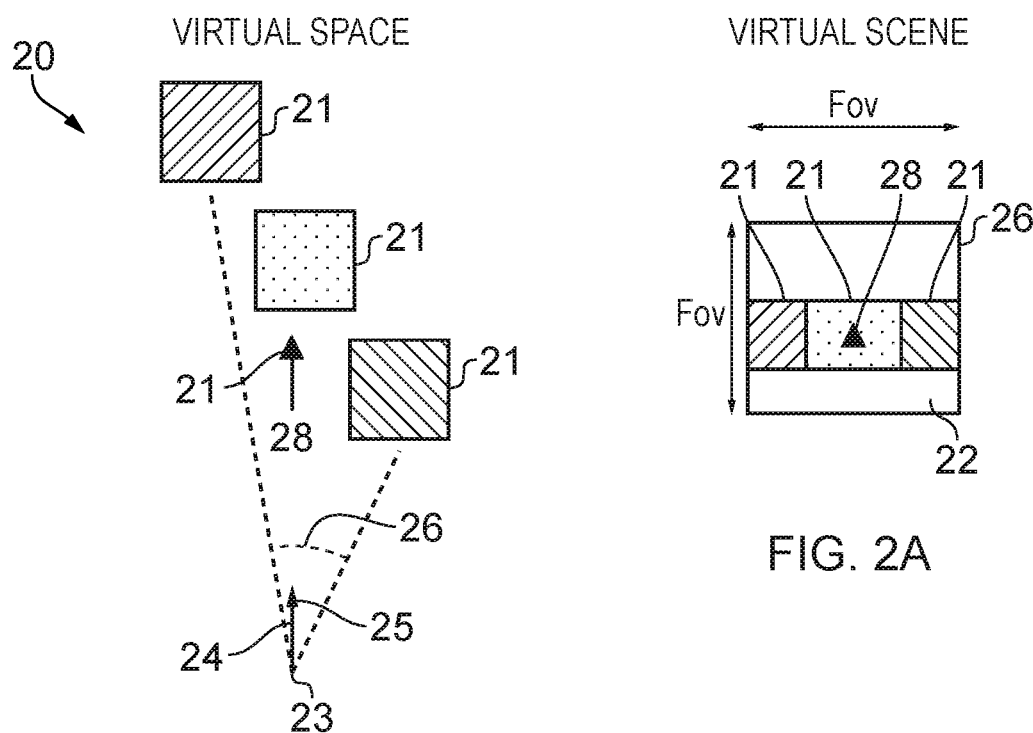
FIG. 1A
FIG. 2A
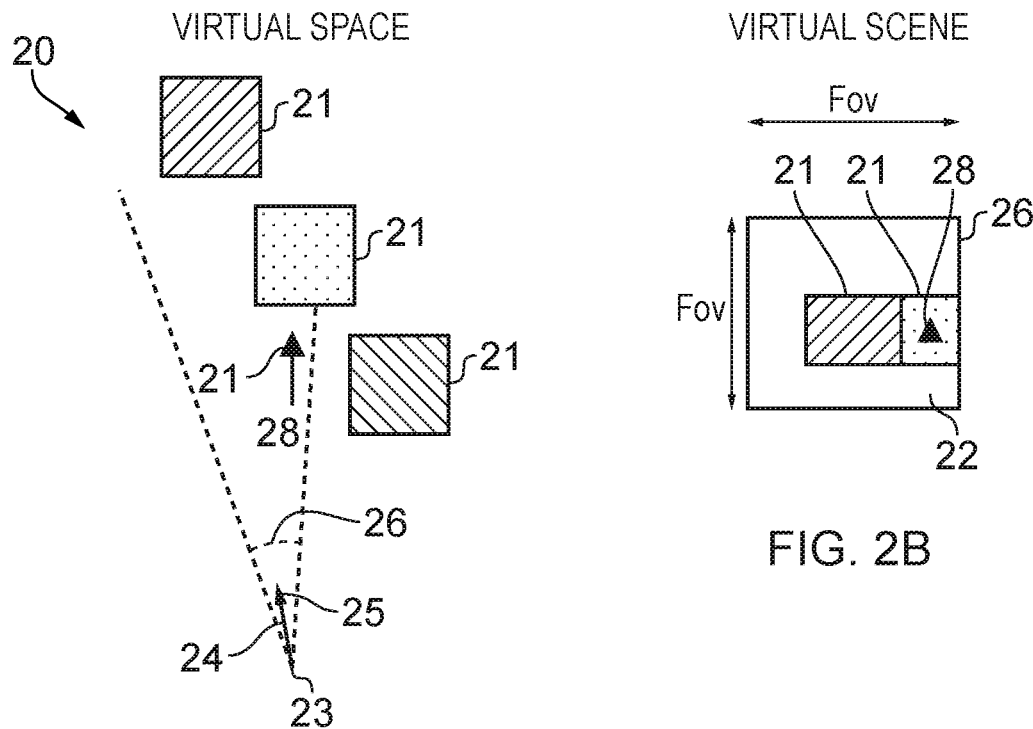
FIG. 1B
FIG. 2B

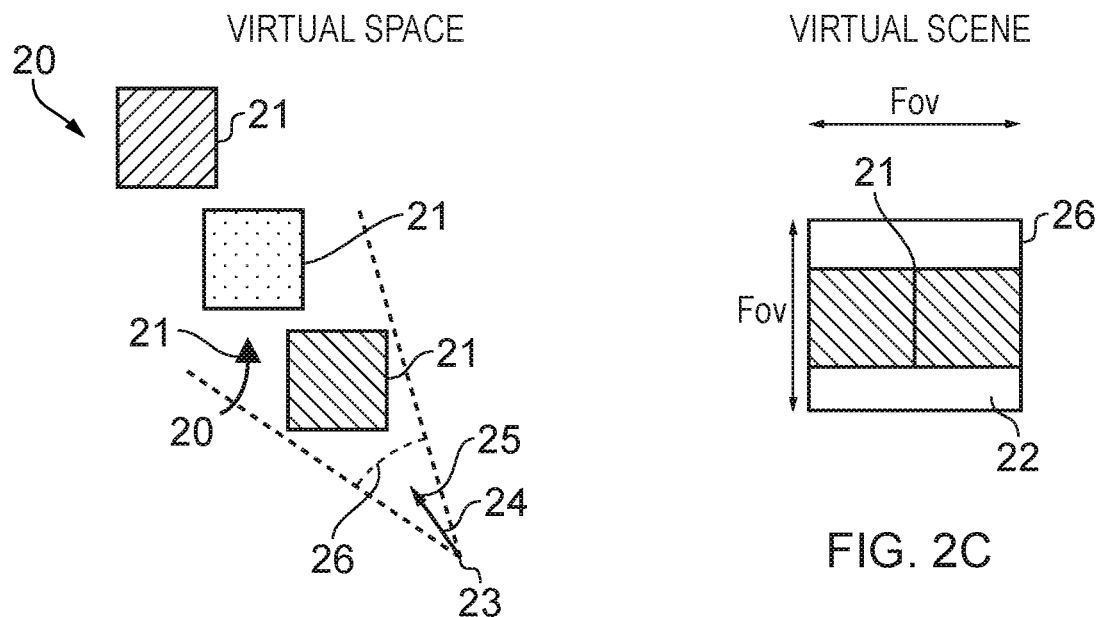
FIG. 1C
FIG. 2C
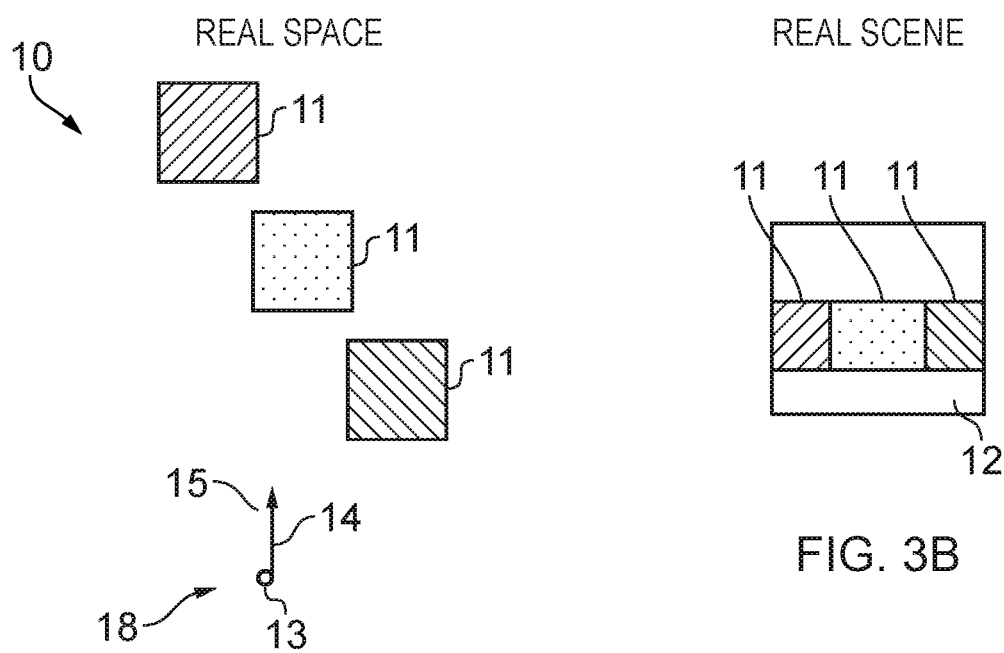
FIG. 3A
FIG. 3B

RENDERING MEDIATED REALITY CONTENT

RELATED APPLICATION

This application was originally filed as PCT Application No. PCT/FI2018/050381, filed on May 21, 2018, which claims priority from EP Patent Application No. 17174540.9, filed on Jun. 6, 2017.

TECHNOLOGICAL FIELD

Embodiments of the present invention relate to rendering mediated reality content. In particular they relate to rendering mediated reality content in different real spaces.

BACKGROUND

Rendering mediated reality content comprises displaying virtual visual spaces within real spaces. A user may be able to move within the real space to view different virtual visual scenes within the virtual visual space. The mediated reality content may also comprise sound spaces that may be provided to the user. The sound spaces may be aligned with the virtual visual spaces.

A user may be able to move within a real space while the content is being rendered. For instance the content may be rendered via a headset which allows the user to move freely within the real space. This may enable the user to move to different positions relative to virtual visual objects and virtual sound sources within the mediated reality content. However this may mean that the way that a user can interact with the mediated reality content is determined by the real space within which the mediated reality content is being rendered. For example objects within the real space may restrict the movement of the user which may be disadvantageous.

BRIEF SUMMARY

According to various, but not necessarily all, examples of the disclosure there is provided a method comprising: storing mediated reality content and associated information relating to a first real space in which the mediated reality content has been displayed; selecting the mediated reality content for display in a second real space; obtaining information relating to the second real space; and using the information relating to the first real space and the information relating to the second real space to adapt the mediated reality content for display in the second real space.

The adapting of the mediated reality content may enable a user to move within a virtual visual space in both the first real space and the second real space.

The adapting of the mediated reality content may enable a virtual visual scene that has been viewed by a user in the first real space to also be viewed by a user in the second real space.

The adapting of the mediated reality content may control the perceived position of virtual visual objects within the second real space so that a user in the second real space can move to the same positions relative to the virtual visual objects as the user in the first real space.

The adapting of the mediated reality content may comprise aligning a virtual visual space that has been displayed in the first real space with the second real space The adapting of the mediated reality content may comprise at least one of; moving, within the second real space, the position at which the mediated reality content is displayed, rotating the mediated reality content within the second real space.

The adapting of the mediated reality content may comprise moving at least one virtual visual object within a virtual visual space.

The adapting of the mediated reality content may comprise changing the scale of at least one of; a virtual visual space of the mediated reality content, one or more virtual visual objects within the mediated reality content.

The mediated reality content may be displayed to a first user in the first real space and the mediated reality content is adapted before it is shared to a second user where the second user is in a second real space.

The method may comprise enabling a user to preview a mapping of the mediated reality content in the second real space and control the adapting of the mediated reality content for the second real space.

The method may comprise enabling user control of the adapting wherein the user control of the adapting enables a user to select at least one virtual visual object so that the virtual visual object is displayed in both the first real space or the second real space.

The associated information stored with the mediated reality content may comprise information relating to at least one of; the size of the first real space, the shape of the first real space, the position of the user within the first real space when the mediated reality content was displayed, the orientation of the user within the first real space when the mediated reality content was displayed, the position of objects within the first real space when the mediated reality content was displayed.

Using the information relating to the first real space and the second real space may comprise comparing the dimensions of the first real space and the second real space and determining an adaptation of the mediated reality content which ensures that a virtual visual object that is displayed in the first real space will be displayed in the second real space.

Using the information relating to the first real space and the second real space may comprise comparing the location of real objects within the first real space and the second real space and controlling the position at which virtual visual objects are displayed in the second real space to enable a user to view the virtual visual object from the same relative positions in both the first real space and the second real space.

An apparatus comprising: means for storing mediated reality content and associated information relating to a first real space in which the mediated reality content has been displayed; means for selecting the mediated reality content for display in a second real space; means for obtaining information relating to the second real space; and means for using the information relating to the first real space and the information relating to the second real space to adapt the mediated reality content for display in the second real space.

An apparatus comprising means for performing any of the methods described above.

An apparatus comprising: processing circuitry; and memory circuitry including computer program code, the memory circuitry and the computer program code configured to, with the processing circuitry, enable the apparatus to: store mediated reality content and associated information relating to a first real space in which the mediated reality content has been displayed; select the mediated reality content for display in a second real space; obtain information relating to the second real space; and use the information relating to the first real space and the information relating to the second real space to adapt the mediated reality content for display in the second real space.

A head mounted viewing device comprising an apparatus as described above.

A computer program that when run on a processor causes storing mediated reality content and associated information relating to a first real space in which the mediated reality content has been displayed; selecting the mediated reality content for display in a second real space; obtaining information relating to the second real space; and using the information relating to the first real space and the information relating to the second real space to adapt the mediated reality content for display in the second real space.

A computer program that when run on a processor causes any of the methods described above.

BRIEF DESCRIPTION

For a better understanding of various examples that are useful for understanding the detailed description, reference will now be made by way of example only to the accompanying drawings in which:

FIGS. 1A-1C and 2A-2C illustrate examples of mediated reality in which FIGS. 1A, 1B, 1C illustrate, from a common top perspective, the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene;

DEFINITIONS

Figure 4:
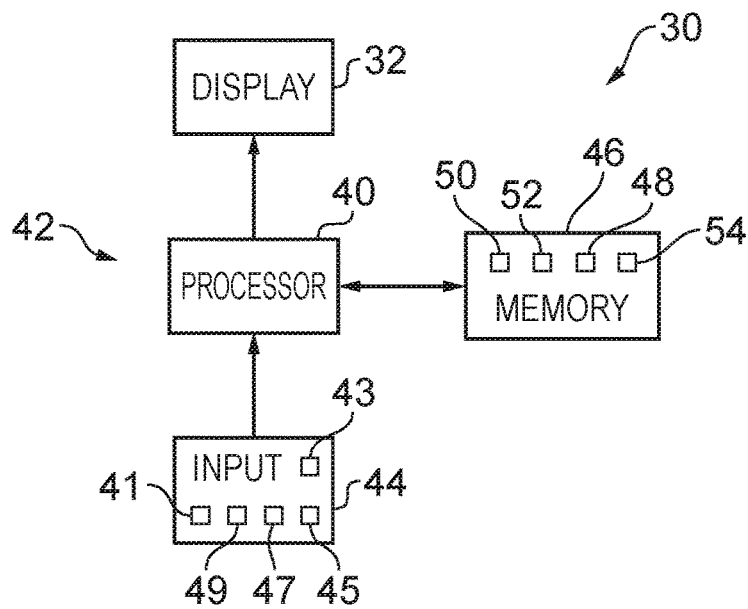
FIG. 4 illustrates an example of an apparatus that is operable to enable mediated reality and/or augmented reality and/or virtual reality.

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view within the virtual visual space.

"virtual visual object" is a visible virtual object within a virtual visual scene.

"real space" refers to a real environment, which may be three dimensional.

"real visual scene" refers to a representation of the real space viewed from a particular point of view within the real space.

"mediated reality" in this document refers to a user visually experiencing a fully or partially artificial environment (a virtual space) as a virtual scene at least partially rendered by an apparatus to a user. The virtual scene is determined by a point of view within the virtual space. Displaying the virtual scene means providing it in a form that can be perceived by the user.

"mediated reality content" is content which enables a user to visually experience a fully or partially artificial environment (a virtual space) as a virtual visual scene. Mediated reality content could include interactive content such as a video game or non-interactive content such as motion video.

"augmented reality" in this document refers to a form of mediated reality in which a user experiences a partially artificial environment (a virtual space) as a virtual scene comprising a real scene of a physical real world environment (real space) supplemented by one or more visual or audio elements rendered by an apparatus to a user.

"augmented reality content" is a form of mediated reality content which enables a user to visually experience a partially artificial environment (a virtual space) as a virtual visual scene. Augmented reality content could include interactive content such as a video game or non-interactive content such as motion video.

"virtual reality" in this document refers to a form of mediated reality in which a user experiences a fully artificial environment (a virtual visual space) as a virtual scene displayed by an apparatus to a user.

"virtual reality content" is a form of mediated reality content which enables a user to visually experience a fully artificial environment (a virtual space) as a virtual visual scene. Virtual reality content could include interactive content such as a video game or non-interactive content such as motion video.

"perspective-mediated" as applied to mediated reality, augmented reality or virtual reality means that user actions determine the point of view within the virtual space, changing the virtual scene.

"first person perspective-mediated" as applied to mediated reality, augmented reality or virtual reality means perspective mediated with the additional constraint that the user's real point of view determines the point of view within the virtual space.

"third person perspective-mediated" as applied to mediated reality, augmented reality or virtual reality means perspective mediated with the additional constraint that the user's real point of view does not determine the point of view within the virtual space.

"user interactive" as applied to mediated reality, augmented reality or virtual reality means that user actions at least partially determine what happens within the virtual space.

"displaying" means providing in a form that is perceived visually (viewed) by the user.

"rendering" means providing in a form that is perceived by the user "sound space" refers to an arrangement of sound sources in a three-dimensional space. A sound space may be defined in relation to recording sounds (a recorded sound space) and in relation to rendering sounds (a rendered sound space).

"sound scene" refers to a representation of the sound space listened to from a particular point of view within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or position. A rendered sound object represents sounds rendered from a particular position.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound scene and virtual visual scene (or visual scene) are corresponding and a notional listener whose point of view defines the sound scene and a notional viewer whose point of view defines the virtual visual scene (or visual scene) are at the same position and orientation, that is they have the same point of view.

"virtual space" may mean a virtual visual space, mean a sound space or mean a combination of a virtual visual space and corresponding sound space. In some examples, the virtual space may extend horizontally up to 360° and may extend vertically up to 180° "virtual scene" may mean a virtual visual scene, mean a sound scene or mean a combination of a virtual visual scene and corresponding sound scene.

"virtual object" is an object within a virtual scene, it may be an artificial virtual object (e.g. a computer-generated virtual object) or it may be an image of a real object in a real space that is live or recorded. It may be a sound object and/or a virtual visual object.

DESCRIPTION

FIGS. 1A-1C and 2A-2C illustrate examples of mediated reality. The mediated reality may be augmented reality or virtual reality.

FIGS. 1A, 1B, 1C illustrate the same virtual visual space 20 comprising the same virtual visual objects 21, however, each Fig. illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1c.

FIGS. 2A, 2B, 2C illustrate a virtual visual scene 22 from the perspective of the different points of view 24 of respective FIGS. 1A, 1B, 1C. The virtual visual scene 22 is determined by the point of view 24 within the virtual visual space 20 and a field of view 26. The virtual visual scene 22 is at least partially displayed to a user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual object 21 such as a visual element 28 within the virtual visual space 20. For example, a user may be able to select and move the virtual object 21.

The mediated reality, augmented reality or virtual reality may be perspective-mediated. In this case, user actions determine the point of view 24 within the virtual visual space 20, changing the virtual visual scene 22. For example, as illustrated in FIGS. 1A, 1B, 1C a position 23 of the point of view 24 within the virtual visual space 20 may be changed and/or a direction or orientation 25 of the point of view 24 within the virtual visual space 20 may be changed. If the virtual visual space 20 is three-dimensional, the position 23 of the point of view 24 has three degrees of freedom e.g. up/down, forward/back, left/right and the direction 25 of the point of view 24 within the virtual visual space 20 has three degrees of freedom e.g. roll, pitch, yaw.

The point of view 24 may be continuously variable in position 23 and/or direction 25 and user action then changes the position and/or direction of the point of view 24 continuously.

Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates an example of a real space 10 comprising real objects 11 that partially corresponds with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping may exist between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates an example of a real visual scene 12 that partially corresponds with the virtual visual scene 22 of FIG. 1A, it includes real objects 11 but not artificial virtual objects. The real visual scene is from a perspective corresponding to the point of view 24 in the virtual visual space 20 of FIG. 1A. The real visual scene 12 content is determined by that corresponding point of view 24 and the field of view 26 in virtual space 20 (point of view 14 in real space 10).

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to a user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single point of view 24 or on multiple images from different points of view at the same time, processed to generate an image from a single point of view 24.

FIG. 4 illustrates an example of an apparatus 30 that is operable to enable mediated reality and/or augmented reality and/or virtual reality.

The apparatus 30 comprises a rendering device or devices 32, which may render information to a user visually via display, aurally via audio output and/or haptically via a haptic device. In the following examples, the rendering device(s) comprise a display 32.

The display 32 is for providing at least parts of the virtual visual scene 22 to a user in a form that is perceived visually by the user. Such a virtual visual scene may form part of mediated reality content 52, such as virtual reality content or augmented reality content.

The display 32 may be a visual display that provides light that displays at least parts of the virtual visual scene 22 to a user. Examples of visual displays include liquid crystal displays, organic light emitting displays, emissive, reflective, transmissive and transflective displays, direct retina projection display, near eye displays or any other suitable type of display.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may comprise a processor 40 configured to load computer program instructions 48 from a memory 46. The controller 42 may be implemented using instructions that enable hardware functionality, for example, by using executable computer program instructions 48 in a general-purpose or special-purpose processor 40 that may be stored on a computer readable storage medium (disk, memory etc.) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores at least a computer program 48 comprising computer program instructions (computer program code) that controls the operation of the apparatus 30 when loaded into the processor 40. The computer program instructions, of the computer program 48, provide the logic and routines that enables the apparatus to perform at least the methods illustrated in FIGS. 5 and 7 to 11. The processor 40 by reading the memory 46 is able to load and execute the computer program 48.

In the example embodiments the memory 46 stores mediated reality content 52. The mediated reality content 52 may comprise augmented reality content and/or virtual reality content.

The memory 46 also stores information 54 associated with the mediated reality content 52. The information 54 may comprise information relating to a real space 10 in which the mediated reality content 52 has been displayed. The information 54 may comprise information about the real space which enables a virtual visual scene 22 that has been viewed by a user in the real space 10 to be recreated in a different real space 10.

The associated information 54 stored with the mediated reality content 52 may comprise information relating to at least one of; the size of the first real space 10, the shape of the first real space 10, the point of view of the user when the mediated reality content 52 was displayed, the position of the user within the first real space 10 when the mediated reality content 52 was displayed, the orientation of the user within the first real space 10 when the mediated reality content 52 was displayed, the position of real objects 11 within the first real space 10 when the mediated reality content 52 was displayed, the position of virtual objects relative to the first real space 10 when the mediated reality content was displayed or any other suitable information.

The information 54 may be associated with the mediated reality content 52 such that when the mediated reality content 52 is retrieved or accessed the information 54 is also retrieved or accessed.

The apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual visual space 20, changing the virtual visual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the controller 42 to determine the point of view 24 within the virtual visual space 20, changing the virtual visual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation by measuring a change in orientation of the user's head and/or a change in the user's direction of gaze.

In some but not necessarily all examples, the apparatus 30 comprises as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to "paint" the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

The apparatus 30 may comprise communication circuitry 41 which enables the apparatus 30 to communicate with another apparatus 30. The communication circuitry 41 may enable mediated reality content 52 and/or the associated information 54 to be shared with one or more other apparatus 30. This may also enable the apparatus 30 to receive information from another apparatus 30. The information that is received may comprise information relating to the real space 10 within which the another apparatus 30 is located.

The communication circuitry 41 may enable the apparatus 30 to communicate within any suitable communications network such as, a cellular network, internet, Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN).

Figure 5A:
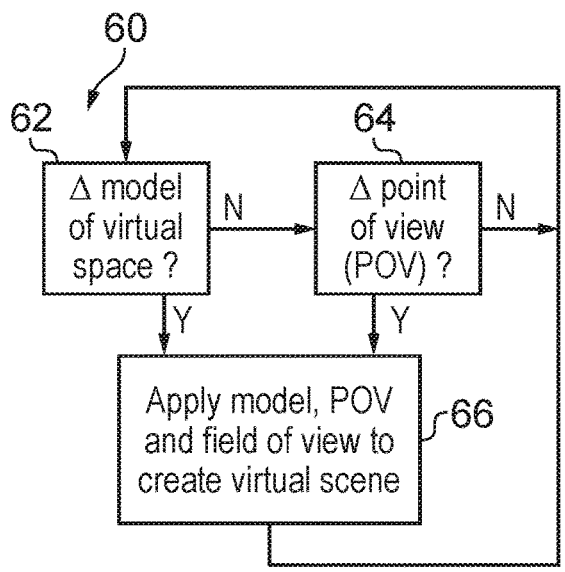
FIG. 5A illustrates an example of a method for enabling mediated reality and/or augmented reality and/or virtual reality.
Figure 5B:
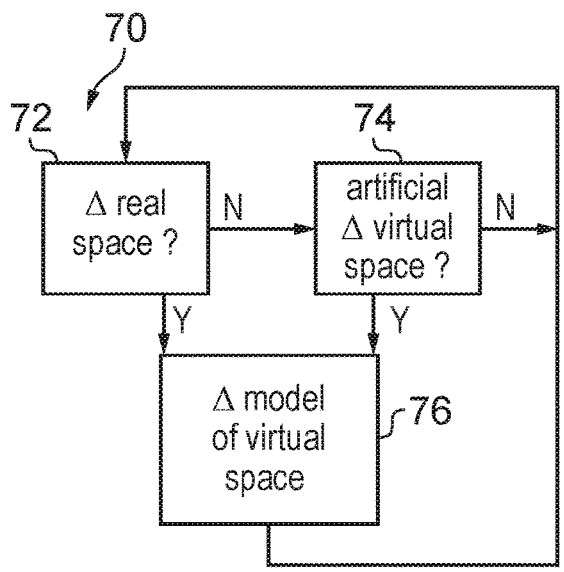
FIG. 5B illustrates an example of a method for updating a model of the virtual visual space for augmented reality.

FIG. 5B illustrates an example of a method 70 for updating a model of the virtual visual space 20 for mediated reality and/or augmented reality and/or virtual reality.

The apparatus 30 may enable mediated reality and/or augmented reality and/or virtual reality, for example using the method 60 illustrated in FIG. 5A or a similar method. The controller 42 stores and maintains a model 50 of the virtual visual space 20. In the example of FIG. 4 the model 50 is stored in the memory 46. The model 50 may be provided to the controller 42 or determined by the controller 42. For example, sensors in input circuitry 44 may be used to create overlapping depth maps of the virtual visual space 20 from different points of view and a three dimensional model may then be produced.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a position of the object.

At block 62 it is determined whether or not the model of the virtual visual space 20 has changed. If the model of the virtual visual space 20 has changed the method moves to block 66. If the model of the virtual visual space 20 has not changed the method moves to block 64.

At block 64 it is determined whether or not the point of view 24 in the virtual visual space 20 has changed. If the point of view 24 has changed the method moves to block 66. If the point of view 24 has not changed the method returns to block 62.

At block 66, a two-dimensional projection of the three-dimensional virtual visual space 20 is taken from the location 23 and in the direction 25 defined by the current point of view 24. The projection is then limited by the field of view 26 to produce the virtual visual scene 22. The method then returns to block 62.

FIG. 5B illustrates an example of a method 70 for updating a model of the virtual visual space 20 for augmented reality. Where the apparatus 30 enables augmented reality, the virtual visual space 20 comprises objects 11 from the real space 10 and also visual elements 28 not present in the real space 10. The combination of such visual elements 28 may be referred to as the artificial virtual visual space.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The blocks illustrated in the FIGS. 5A & 5B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Figures 6A, 6B, 6C:
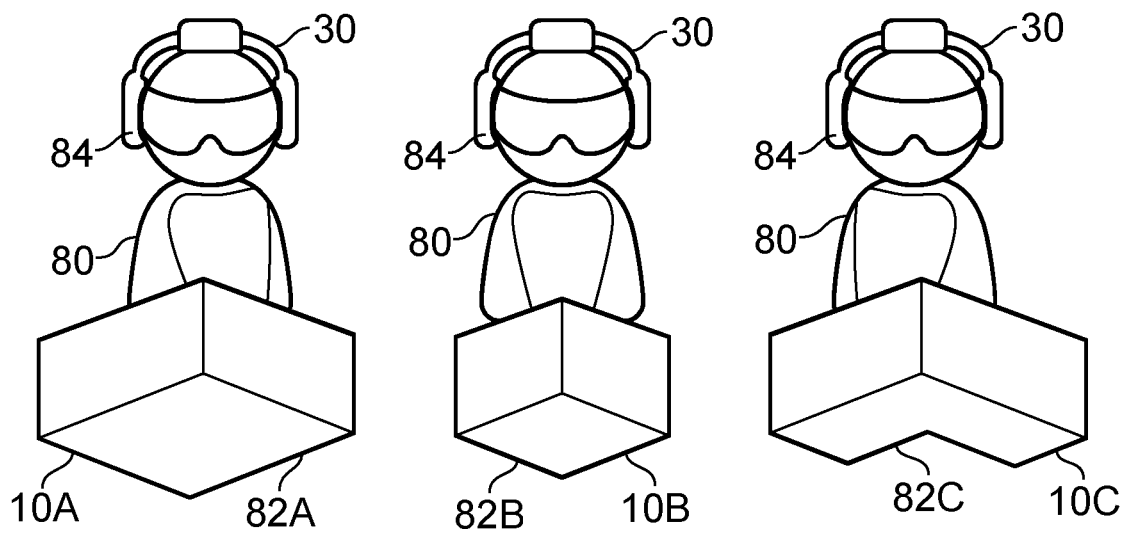
FIGS. 6A to 6C illustrate users viewing mediated reality content in different real spaces.

FIGS. 6A to 6C illustrate examples of a user 80 using an apparatus 30 that enables the user to perceive mediated reality content 52. The apparatus 30 enables display of at least part of the virtual visual scene 22 to users 80. The apparatus 30 may also enable sound scene corresponding to the virtual visual scene 22 to be rendered to the user 80. The mediated reality content 52 may be first person perspective mediated content so that the real space 10 and the position of the user 80 within the real space 10 determines the virtual visual scenes 22 that can be viewed by the user 80. In some examples the position of the user 80 within the real space may also determine the sound scenes that can be heard by the user 80.

In the examples of FIGS. 6A to 6C the apparatus 30 is provided within a head-mounted viewing device 84. The head-mounted viewing device 84 is worn by the user 80 so that the head-mounted viewing device 84 moves when the head of the user 80 moves. The head mounted viewing device 84 may be arranged for rendering virtual content. In such examples the user 80 may be fully immersed in the content so that the real scene 12 is not visible through the head mounted viewing device 84. In other examples, the head-mounted viewing device 84 may be a see-through arrangement for augmented reality that enables a live real scene 12 to be viewed while one or more visual elements 28 are displayed by the display(s) 32 to the user to provide in combination the virtual visual scene 22. In this case a visor, if present, is transparent or semi-transparent so that the live real scene 12 can be viewed through the visor.

The head-mounted viewing device 84 may be operated as a see-video arrangement for augmented reality that enables a live or recorded video of a real scene 12 to be displayed by the display(s) 32 for viewing by the user 80 while one or more visual elements 28 are simultaneously displayed by the display(s) 32 for viewing by the user 80. The combination of the displayed real scene 12 and displayed one or more visual elements 28 provides the virtual visual scene 22 to the user 80. In this case the visor is opaque and may be used as the display(s) 32.

As the user 80 experiences the mediated reality content 52, the processor 40 continually cycles through the method illustrated in FIG. 5A and, in the case of augmented reality content, FIG. 5B.

The user 80 is positioned within a real space 10. The real space 10 may comprise an enclosed space such as a room or any other suitable environment. A virtual visual space 20 may be displayed within the real space 10. The virtual visual space 20 may comprise a portion of the mediated reality content 52. The user 80 may be able to move within the virtual visual space 20 by moving within the real space 10. When the user moves within the virtual visual space 20 this may change the virtual visual scenes 22 that they view.

The virtual visual space 20 within which the user 80 can move is determined by the size and shape of the real space 10 in which the mediated reality content 52 is displayed. The user's movements within the virtual space 20 may be restricted by real objects 11 within the real space 10. For instance, if a wall or item of furniture is positioned within the real space 10 this will block the movement of the user 80. The real objects 11 may limit the positions in which the user 80 can be positioned relative to the virtual visual object 21 and so may restrict the virtual visual scenes 22 that are available to the user 80.

The mediated reality content 52 may comprise content which is displayed so that it is perceived to be outside the real space 10. For instance one or more virtual visual objects 21 may be displayed so that they appear to be further away than the limits of the real space 10. However, the user 80 may be prevented from moving to these virtual visual objects 21 by the walls or other real objects in the real space 10. A visual marker or other indication may be provided to the user 80 to indicate the limits of the real space 10.

In the example of FIG. 6A the user 80 is viewing mediated reality content 52 in a first real space 10A. The first real space 10A comprises a room 82A having a rectangular shape. The room 82A may be such that if a virtual visual object 21 is displayed in the room 82A there is sufficient space to allow the user 80 to move around the virtual visual object 21. This may enable the user 80 to view virtual visual scenes 22 comprising different sides of the virtual visual object 21.

In the example of FIG. 6B the user 80 is viewing the same mediated reality content 52 in a second real space 10B. The second real space 10B also comprises a room 82B having a rectangular shape however the room 82B in the second real space 10B is smaller than the room 82A in the first real space 10A. As the room 82B in the second real space 10B is smaller than the first room 82A this means that the virtual visual space 20 within which the user 80 can move is reduced in the second room 82B compared to the first room 82A. This means that the user 80 in the second real space 10B might be prevented from interacting with the mediated reality content 52 in the same way that the user 80 in the first real space 10A can. For instance, if a virtual visual object 21 is displayed in the room 82B there might not be sufficient space within the room 82B to allow the user 80 to move around the virtual visual object 21. This may restrict the virtual visual scenes 22 comprising the virtual visual object 21 that are available to the user 80 in the second real space 10B such that some virtual visual scenes 22 that can be viewed in the first real space 10A cannot be viewed in the second real space 10B.

In the example of FIG. 6C the user 80 is viewing the same mediated reality content 52 in a third real space 100. The third real space 10C comprises a different shaped room 82C to the examples of FIGS. 6A and 6B. In the example of FIG. 6C the real space 10C comprises an L-shaped room 82C. As the room 82C has a different shape this means that the virtual visual space 20 within which the user 80 can move also has a different shape. This means that the user can move into different parts of the virtual visual space 20 and view different virtual visual scenes 22.

Therefore the way the user 80 experiences the mediated reality content 52 is dependent upon the real space 10 in which the mediated reality content 52 is displayed. This may be disadvantageous, for example if a user 80 wishes to share the mediated reality content 52 with a user located in a different real space. A user 80 might wish to share the mediated reality content 52 to enable multiplayer games or other multi-user experiences. This could also be disadvantageous if the user 80 wants to use the same mediated reality content 52 in different real spaces 10. For example, the user 80 may begin rendering the mediated reality content 52 in a first room 82 but may pause the mediated reality content 52 and continue rendering in a different room 82.

Figure 7:
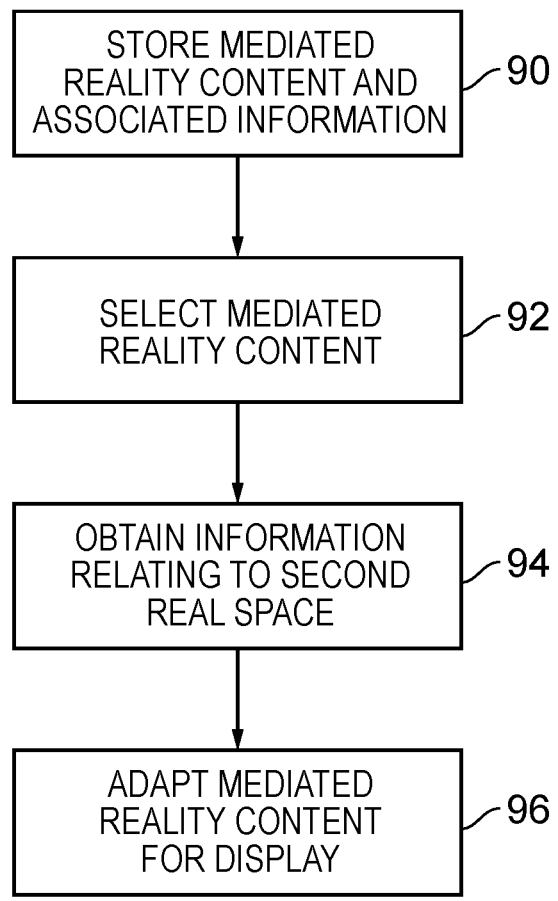
FIG. 7 illustrates an example method for enabling mediated reality and/or augmented reality and/or virtual reality.

FIG. 7 illustrates an example of a method which enables users 80 to share and have similar experiences of the same mediated reality content 52 even when the mediated reality content 52 is displayed in different real spaces 10. The method may be implemented using apparatus 30 as described above.

The method comprises, at block 90, storing mediated reality content 52 and associated information 54. The associated information 54 relates to a first real space 10 in which the mediated reality content 52 has been displayed.

The associated information 54 may comprise any information which provides an indication of the virtual visual scenes 22 that were available to the user 80 in the first real space 82. For instance, the associated information 54 may comprise information indicating the size and/or shape of the first real space 10A. This information may indicate the portion of the mediated reality content 52 corresponding to the virtual visual space 20 within which the user 80 could move.

The associated information 54 may also comprise information relating to the position and/or orientation of the user 80 within the first real space 10A when the mediated reality content 52 was displayed. This information may indicate the point of view of the user 80. This may indicate the virtual visual scenes 22 that have been viewed by the user 80.

The associated information 54 may also comprise information about the real space 10 which may affect the way in which the user 80 can interact with the mediated reality content 52. For instance, the associated information 54 may comprise information about real objects 11 within the real space 10A. The real objects 11 may restrict the movement of the user 80 within the real space 10 and so may limit the virtual visual space 20 within which the user can move and so determine the virtual visual scenes 22 comprising the virtual visual objects 21 that are available to the user 80.

The associated information 54 used in the example of FIG. 7 may also comprise information relating to at least one of; the size of the first real space 10A, the shape of the first real space 10A, the point of view of the user when the mediated reality content 52 was displayed, the position of the user within the first real space 10A when the mediated reality content 52 was displayed, the orientation of the user within the first real space 10A when the mediated reality content 52 was displayed, the position of real objects 11 within the first real space 10A when the mediated reality content 52 was displayed, the position of virtual objects relative to the first real space 10A when the mediated reality content was displayed or any other suitable information.

The information 54 may be associated with the mediated reality content 52 such that when the mediated reality content 52 is retrieved or accessed the information 54 is also retrieved or accessed.

At block 92 the method comprises selecting the mediated reality content 52 for display in a second real space 10B. The mediated reality content 52 may be selected in response to a user actuating the input 43. When the mediated reality content 52 is displayed in the second real space 10B it may be displayed to a second user. The second user may be different to the first user who viewed the mediated reality content in the first real space 10A.

In some examples a first user 80, that has viewed the mediated reality content 52, may select the mediated reality content 52 to be shared with a different user. In other examples a second user 80, that has not viewed the mediated reality content 52, may select the mediated reality content 52 and request the first user 80 to share the mediated reality content 52. The two users 80 may be in different real spaces 10A, B. In some examples the mediated reality content 52 may be shared so that the two users 80 can view the same mediated reality content 52 at the same time. This may enable the two users 80 to interact with each other within the mediated reality content 52.

In other examples the mediated reality content 52 may be selected by the same user 80 to be viewed at a different real space 10 at a different point in time. For instance, a user 80 may begin rendering the mediated reality content 52 in a first real space 10. The user 80 could then pause the mediated reality content 52 and continue rendering the mediated reality content 52 at a later point in time in a different real space 10.

At block 94 the method comprises obtaining information relating to the second real space 10B. The information relating to the second real space 10B may be obtained using any suitable means. In examples where the mediated reality content 52 is shared between different apparatus 30 associated with different users 80 the communication circuitry 41 could be used to receive information from the different apparatus 30. In examples where the same apparatus 30 is used in different real spaces 10A, B the inputs such as the depth sensors 49 and the image sensors 47 could be used to obtain the information about the second real space 10B.

The information relating to the second real space 10B may comprise information about features of the second real space 10B which affects the virtual visual space 20 within which the user 80 can move. The information relating to the second real space 10B could comprise information relating to the size and/or shape of the real space 10B. In some examples the information may comprise information relating to real objects 11 which may affect the way a user can interact with virtual visual objects 21 within the real space 10A, B.

At block 96 the method comprises using the information 54 relating to the first real space 10A and the information relating to the second real space 10B to adapt the mediated reality content 52 for display in the second real space 10B.

The adapting of the mediated reality content 52 modifies the mediated reality content 52 so that a user 80 can move within the same virtual visual space 20 in both the first real space 10A and the second real space 10B. This may enable a virtual visual scene 22 that has been viewed by a user 80 in the first real space 10A to be viewed by a user 80 in the second real space 10B. This may ensure that the experience that a user 80 has in the first real space 10A is matched or closely matched by the experiences available in the second real space 10B.

The adapting of the mediated reality content 52 may comprise any modifications which enable a user to be able to move within the same virtual visual space 20 and/or view the same virtual visual scenes 22 in different real spaces 10. In some examples the adapting of the mediated reality content 52 may comprise controlling the perceived positions of one or more virtual visual objects 21 within the second real space 10B. This may enable the virtual visual objects 21 to be positioned so that a user 80 can move into the same positions relative to the virtual visual objects 21 in both the first real space 10A and the second real space 10B. For instance if a user 80 can move around a virtual visual object 21 in the first real space 10A the position of the virtual visual object 21 in the mediated reality content 52 may be modified so that the user 80 can also move around the virtual visual object 21 in the second real space 10B.

In some examples the adapting of the mediated reality content 52 may comprise aligning a virtual visual space 20 that has been rendered in a first real space 10A with a second real space 10B. For instance, where the second real space 10B is smaller than the first real space 10A a user in the second real space 10B can only move within a smaller virtual visual space 20. This may mean that some virtual visual objects 21 that can be reached by a user 80 moving in the first real space 10A cannot be reached by the user 80 moving in the second real space 10B. The alignment of the mediated reality content 52 may position the mediated reality content 52 so that the key virtual visual objects 21 or any selected virtual visual objects 21 are positioned within the virtual visual space 20 that the user 80 in the second real space 10 can move to reach them.

In some examples the adapting of the mediated reality content 52 may comprise cropping a virtual visual space 20 of the mediated reality content 52. The cropping of the virtual visual space 20 may ensure that one or more virtual visual objects 21 that are displayed in the first real space 10A are also displayed in the second real space 10B. The cropping may be made in any suitable positions of the virtual visual space 20. For instance where two virtual visual objects 21 are displayed in the first real space 10A a portion of the virtual visual space 20 between the two virtual visual objects 21 may be cropped when the mediated reality content 52 is displayed in a smaller second real space 10B.

This cropping may enable the virtual visual objects 21 to be displayed at the same size in different real spaces 10A, B that have different sizes. This may be useful in cases where the mediated reality content 52 between the virtual visual objects 21 is not considered to be interesting to the users.

In some examples the adapting of the mediated reality content 52 may comprise scaling a virtual visual space 20 of the mediated reality content 52. The scaling may comprise resizing the virtual visual space 20 which may enable repositioning of virtual visual objects 21 within the virtual visual space 20. The scaling may increase the size of the virtual visual space 20 or decrease the size of the virtual visual space 20 depending on the difference in sizes of the first and second real spaces 10A, B.

As the scaling depends on the different sizes and shapes of the first and second real spaces 10A, B different scalings will be used in different implementations. Different scalings may be used for different axis of the mediated reality content 52 in order to enable the mediated reality content 52 to be optimised for the different real spaces 10A, 10B.

In some examples the adapting of the mediated reality content 52 may comprise changing a scale of one or more virtual visual objects 21 within the virtual visual space 20. This may ensure that the whole of a virtual visual object 21 that is displayed in a first real space 10A is also displayed in a second real space 10B.

In some examples the adapting of the mediated reality content 52 may comprise moving at least one virtual visual object 21 within a virtual visual space 20. For instance it may comprise moving a virtual visual object 21 so that when the mediated reality content 52 is displayed in the second real space 10B the user can move relative to the virtual visual object 21 in the same way that they could in the first real space 10A. This could ensure that the virtual visual object 21 is not displayed adjacent to any real objects 11, such as walls or items of furniture, which could prevent the user 80 from moving around the virtual visual object 21.

In some examples the adapting of the mediated reality content 52 may comprise moving, within the second real space 10B, the position at which the mediated reality content 52 is displayed. For instance the default setting may be to display the mediated reality content 52 in a centre portion of a room 82. However it may be determined that a different portion of the room 82 is a better location in which to display the mediated reality content 52. For example the different portion of the room 82 may have a better size or shape and/or may have less real objects 11 which restrict the user's experience of the mediated reality content 52.

In some examples the adapting of the mediated reality content 52 may comprise rotating, within the second real space 10B, the position at which the mediated reality content 52 is displayed. The rotation of the mediated reality content 52 may be combined with other movements of the mediated reality content 52.

In order to ensure that the experience that a user 80 has in the first real space 10A is matched or closely matched by the experiences available in the second real space 10B both the visual content and the audio content of the mediated reality content 52 may be adapted. The adaptations of the audio content may correspond to any adaptations that are made to the visual content. For instance, if a virtual visual object 21 corresponds to a sound source then any movement or modification of the virtual visual object 21 would also be accompanied by a corresponding movement or modification of the sound source. Similarly any rotations or movements of the visual content may be accompanied by a corresponding movement or rotation of the audio content.

The information 54 about the different real spaces 10 is used to determine the adaptation that should be performed on the mediated reality content 52. In some examples the processor 40 may use the information 54 to compare the first real space 10 and the second real space 10 and determine the changes that need to be made to the mediated reality content 52.

In some examples the apparatus 30 may enable the user 80 to select the adaptation that is to be made to the mediated reality content 52. For example, a preview of the second real space 10 and the virtual visual scene 22 that can be viewed in the second real space 10 could be displayed to the user 80. The user 80 could then select an adaptation of the mediated reality content 52 so that the user 80 can have a similar experience of the mediated reality content 52 in either of the real spaces 10. For instance, the user 80 could select to move or rescale the virtual visual scene 22 as needed to fit certain virtual visual objects 21 within the second real space 10.

The adaptation of the mediated reality content 52 may be performed by any suitable apparatus. In some examples the adaptation may be performed by a controller 42 within the rendering device used by the user 80. In other examples the adaptation may be performed, at least in part by one or more other devices such as a remote server.

In some examples the adaptation of the mediated reality content 52 may be performed automatically in response to any suitable trigger event. The trigger event could be the user 80 selecting to share the content with another user or the user 80 selecting to use the mediated reality content 52 in a different real space 10 or any other suitable trigger event. When the adaptation occurs automatically no further input is needed from the user 80 after the trigger event has been detected. In other examples the adaptation of the mediated reality content 52 may require user input. For example the user 80 may select how the mediated reality content 52 is to be rescaled or moved so that the key virtual visual objects 21 are included in the adapted mediated reality content 52.

Figure 8A:
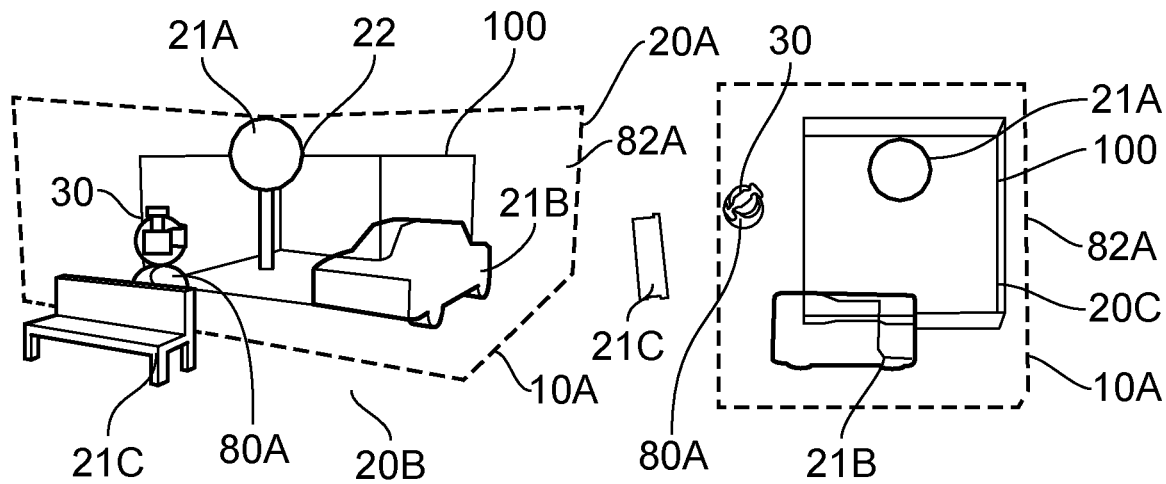
FIGS. 8A to 8C illustrate a user selecting an adaptation of mediated reality content for use in different real spaces.
Figure 8B:
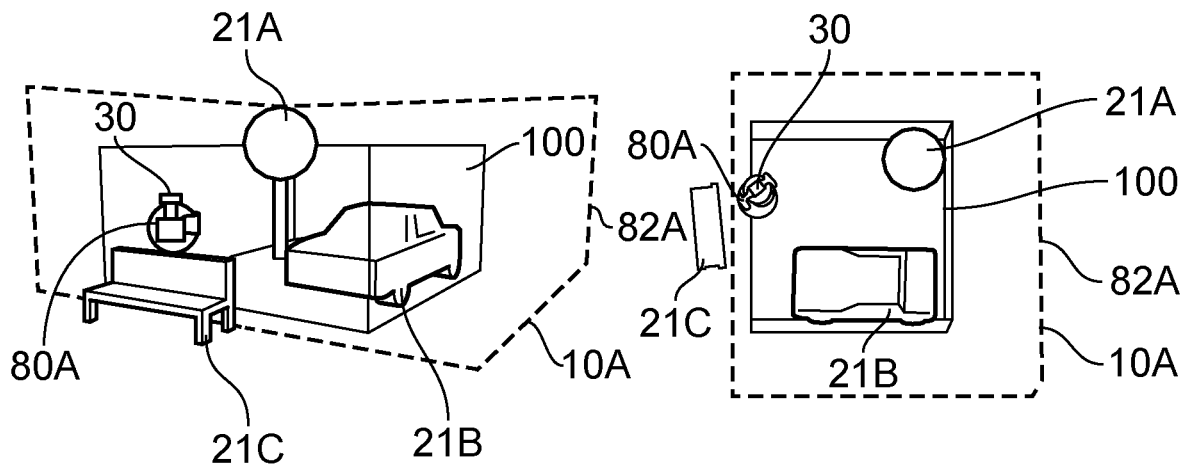
Figure 8C:
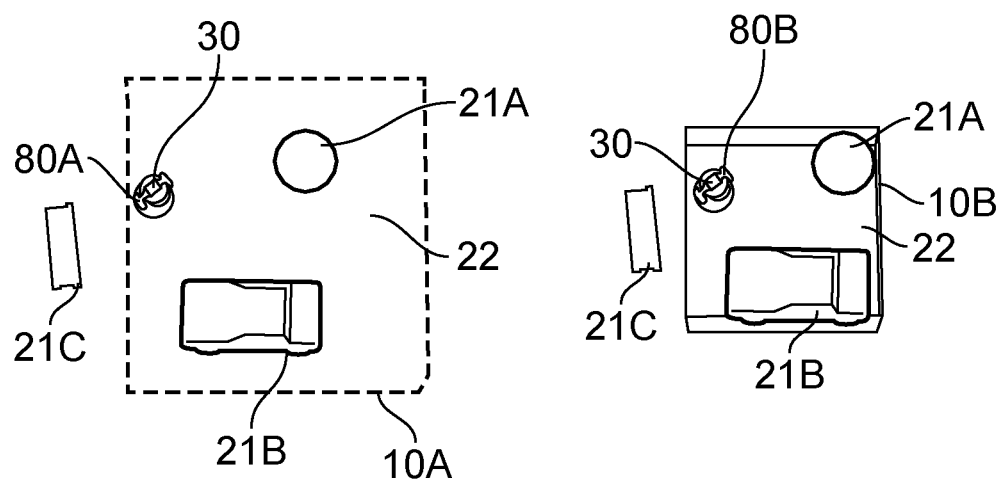

FIGS. 8A to 8C illustrates an example of a first user 80A in a first real space 10A selecting an adaptation of mediated reality content 52 for use by a second user 80B in a second real space 10B. In this example the mediated reality content 52 is adapted so that virtual visual space 20 that has been displayed in the first real space 10A is aligned with the second real space 10B. The alignment ensures that there is a virtual visual space 20 corresponding to a portion of the mediated reality content 52 that a user 80 can move within in both the first real space 10A and the second real space 10B. The alignment ensures that this virtual visual space 20 includes key virtual visual objects 21 so that the user 80 can have a similar experience of these virtual visual objects 21 in both the first real space 10A and the second real space 10B.

FIG. 8A shows a side view and a plan view of a first user 80A viewing a virtual visual scene 22 of the mediated reality content 52. The user 80A is positioned in a first real space 10A which comprises a rectangular room 82A. The mediated reality content 52 comprises a first virtual visual space 20A which is perceived to be displayed within the first real space 10A and a second virtual visual space 20B which is not perceived to be displayed within the first real space 10A. The first virtual visual space 20A is indicated by the dashed lines in FIG. 8A. The second virtual visual space 20B is the area outside the dashed lines in FIG. 8A.

The user 80A can move within the first virtual visual space 20A. This may enable the user 80A to reach and/or move around the virtual visual objects 21 displayed in the first virtual visual space 20A. However the user 80A can view virtual visual objects 21 which are outside the first virtual visual space 20A but cannot reach or move around them.

In the example of FIG. 8A two virtual visual objects 21A and 21B are displayed in the first virtual visual space 20A. In this example the first virtual visual object 21A is a tree and the second virtual visual object 21B is a car. A third virtual visual object 210 is displayed outside the first virtual visual space 20A. In this example the third virtual visual object 21C is a bench. The first user 80A in the first room can move around and reach the tree and the car. The first user 80A can view the bench but cannot move to the bench because the walls of the room 82A are blocking the way.

The first user 80A wishes to share the mediated reality content 52 with a second user 80B so that the second user 80B can have a similar experience of the mediated reality content 52.

This may enable the second user 80B to view the same virtual visual scene 22 and interact with the same virtual visual objects 21. A user 80 can interact with the virtual visual objects 21 by reaching them or moving around them. The second user 80B is positioned in a second real space 10B which comprises a smaller rectangular room 82B.

The input circuitry 43 may detect the first user 80A making a user input indicating that they wish to share the mediated reality content 52 with the second user 80B. In response to this input the apparatus 30 may obtain information about the real space 10B in which the second user 80B is located. In the example of FIGS. 8A to 8C the information may comprise information about the size and shape of the second room 82B.

The information relating to the second real space 10B is used to create a template 100 of the second room 82B. The template 100 of the second room 82B is displayed in the virtual visual scene 22 so that the first user 80A has a preview of the virtual visual space 20C that the second user 80B will be able to move within if they share the mediated reality content 52. In the example of FIGS. 8A and 8B the template 100 is indicated by the dark grey area. The template 100 provides an indication of the boundaries of the virtual visual space 20C that the second user 80B will be able to move within.

As the second room 82A is smaller than the first room 82B the virtual visual space 20C that the second user 80B can move in is smaller than the virtual visual space 20A that the first user 80A can move in. In FIG. 8A the template 100 only covers a portion of the virtual visual objects 21A, 21B. This means that only a portion of the virtual visual objects 21A, 21B would be in the virtual visual space 20C that the second user 80 can move within. This may prevent the second user 80B from reaching or moving around the virtual visual objects 21A, 21B. However the first user 80A may want the second user 80B to be able to reach and/or move around both of the virtual visual objects 21A, 21B and so may adapt the mediated reality content 52 before it is shared.

FIG. 8B shows a side view and a plan view the first user 80A adapting the mediated reality content 52 so that the second user 80B can reach and/or move around both of the virtual visual objects 21A, 21B. In the example of FIG. 8B the user controls the position of the mediated reality content 52 to be displayed in the second real space 10B by moving the position of the template 100 within the virtual visual scene 22. The template 100 may be moved in response to a user input detected by the input circuitry 43. In FIG. 8B the user has moved the template 100 so that it covers both of the virtual visual objects 21A and 21B.

In the example of FIG. 8B the user also controls the scaling of the mediated reality content by changing the distance between the various virtual visual objects 21A, 21B, 21C. In the example of FIG. 8B the second virtual visual object 21B has been moved so that it is closer to the other virtual visual objects 21A, 21C. It is to be appreciated that other adaptations could be made in other examples. For instance, the mediated reality content 52 could be rotated or otherwise moved within the real spaces 10.

When the visual content has been adapted the audio content may also be adapted. In the example of FIG. 8B the second virtual visual object 21B has been moved closer to the user 80A. A sound source corresponding to the second virtual visual object 21B may also be moved closer to the user 80A so that the adapted sounds corresponds to the adapted positions of the second virtual visual object 21B.

Once the first user 80A has selected how the mediated reality content 52 is to be adapted the mediated reality content 52 may be shared to the second user 80B. FIG. 8C shows the first user 80A viewing the mediated reality content 52 in the first real space 10A and the second user 80B viewing the mediated reality content 52 in the second real space 10B. The second user 80B is viewing the adapted mediated reality content 52. The position of the mediated reality content 52 is aligned with the second room 82B so that the real space 10 in which the second user 80B can move corresponds to a virtual visual space 20C comprising both of the virtual visual objects 21A, 21C.

FIG. 8C shows plan views of the first user 80A and the second user 80B rendering the mediated reality content 52. The mediated reality content 52 has been adapted for the second user 80B as indicated by the first user 80A so that both the first user 80A and the second user 80B are viewing a similar virtual visual scene 22 comprising the virtual visual objects 21A, 21B. The virtual visual scene 22 is similar in that it contains the same virtual visual objects 21A, 21B. the mediated reality content around the virtual visual objects 21A, 21B may be different for the different users 80A, 80B however both the first user 80A and the second user 80B may be able to move to and move around the virtual visual objects 21A, 21B. This may ensure that the first user 80A and second user 80B can have similar experiences with the mediated reality content 52.

In some examples both of the users 80A, 80B may be viewing the mediated reality content 52 at the same time. This may enable the users 80A, 80B to interact with each other while using the mediated reality content 52.

In some examples when the first user 80A shares the mediated reality content 52 with the second user 80B the mediated reality content 52 is adapted for the second user 80B but the content as rendered for the first user 80A is unchanged. In other examples when the first user 80A shares the mediated reality content 52 with the second user 80B the mediated reality content 52 may be adapted for both the first user 80A and the second user 80B. This may cause the mediated reality content 52 to be changed for the first user 80A but may enable an identical virtual visual scene to be provided to both the first user 80A and the second user 80B.

FIGS. 9A to 9D illustrate an example of a first user 80A selecting an adaptation of mediated reality content 52 for use in different real spaces 10.

Figure 9A:
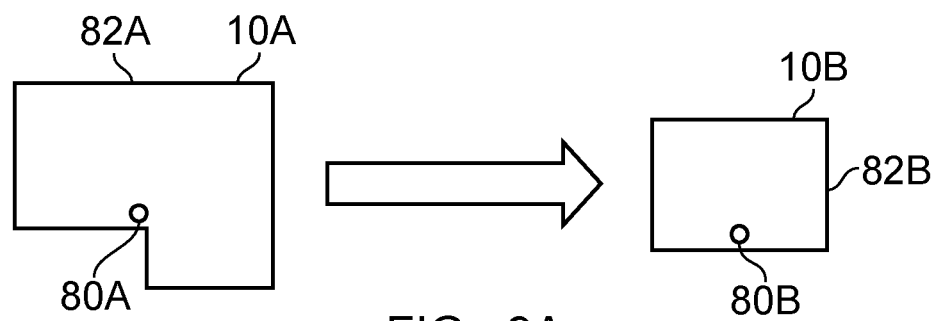
FIGS. 9A to 9D illustrate a user selecting an adaptation of mediated reality content for use in different real spaces.

FIG. 9A illustrates a plan view of a first real space 10A which comprises a first room 82A and a second real space 10B which comprises a second room 82B. The first room 82A is an L-shaped room. The second room 82B is smaller than the first room 82A. A first user 80A in the first room 82A may wish to share mediated reality content 52 that they are viewing with a second user 80B in the second room 82B.

Figure 9B:
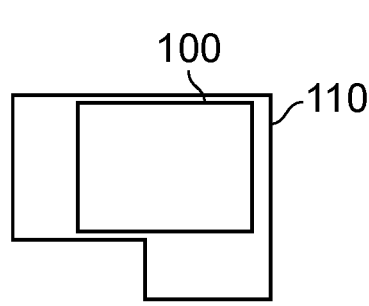

Once the first user 80A has indicated that they wish to share the mediated reality content 52 information about the second real space 10B is obtained. This information comprises the size and shape of the second room 82B. In FIG. 9B this information is used to generate a template 100 of the second room 82B and display this to the first user 80A via the first user's apparatus 30. In FIG. 9B a template 100 of the second room 82B is displayed overlaying the plan 110 of the first room 82A. This provides an indication to the first user 80A which parts of the mediated reality content 52 will be included in the virtual visual space 20 that the second user 80B can move within.

The template 100 of the second room 82B may initially be displayed in a default position. The default position may be in the center of the plan 110 of the first room 82A. The first user 80A may want to enable the second user 80B to be able to move within a different part of the mediated reality content 52. For instance the virtual visual objects 21 that are most interesting to the first user 80A may be located in a different part of the first room 82A. In such cases the first user 80A may make a user input to move the template 100 of the second room 82B from the default position to their chosen position.

Figure 9C:
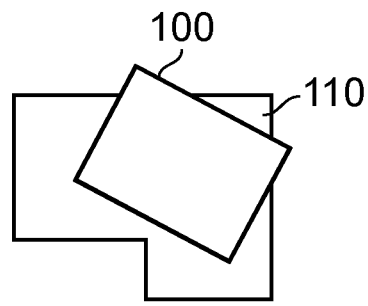

FIG. 9C shows the template being moved from a default position to a position chosen by a user 80. In the example of FIGS. 9A to 9D the template 100 is being moved within the real space and rotated clockwise through 90°. Other movements of the template 100 would be made in other implementations of the disclosure depending on the sizes and shapes of the different real spaces 10.

Figure 9D:
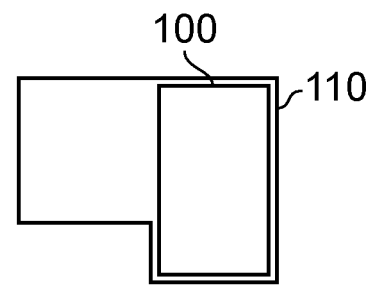

In FIG. 9D the first user 80A has moved the template 100 to the chosen position. The first user 80A may make a user input confirming that they wish to share this portion of the mediated reality content 52. In response to the user input the apparatus 30 may adapt the mediated reality content 52 so that it will be repositioned within the second room 82B and enable it to be shared with the second user 80B.

Figure 10:
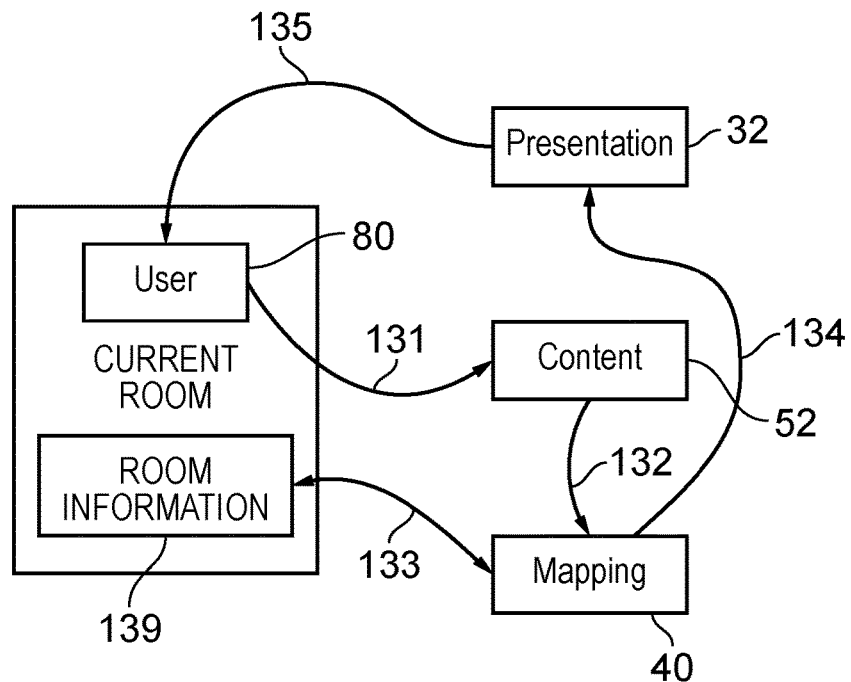
FIG. 10 illustrates an example method for enabling mediated reality and/or augmented reality and/or virtual reality.

FIG. 10 illustrates an example method for enabling mediated reality and/or augmented reality and/or virtual reality. FIG. 10 illustrates an example where the mediated reality content 52 is used by the same user 80. For instance, the user 80 may be using the mediated reality content 52 in a first real space 10A at a first time. The user 80 may then wish to continue using the mediated reality content 52 in a second real space 10B at a different time.

At block 131 the user 80 selects the mediated reality content 52. The mediated reality content 52 may be mediated reality content 52 that the user 80 has used at an earlier point in time. The mediated reality content 52 is stored with associated information 54 relating to the real space 10A in which the mediated reality content 52 was used. At block 132 the mediated reality content 52 and the associated information 54 is provided to a mapping processing. The mapping processing may be performed by a processor 40.

At block 133 information 139 about the current real space 10B of the user 80 is also provided to the mapping processing. The information 139 about the current real space 10B may be obtained using input circuitry 43 or by any other suitable means.

The mapping processing uses the information about the respective real spaces to determine how the mediated reality content 52 should be adapted. Once the mediated reality content 52 has been adapted it is rendered by the apparatus 30 at block 134. For instance, it is displayed on a display 32 of the apparatus 30. At block 135 the user views the virtual visual scenes and hears the audio scenes that are presented via the apparatus 30.

Figure 11:
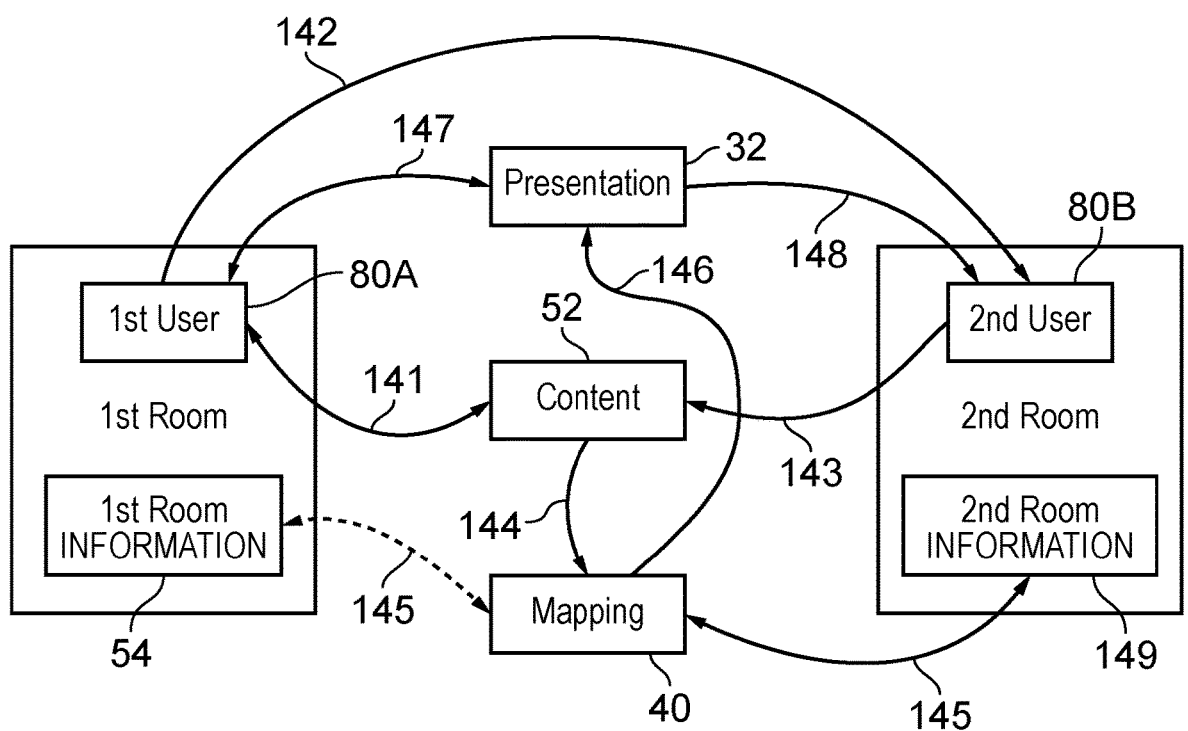
FIG. 11 illustrates an example method for enabling mediated reality and/or augmented reality and/or virtual reality.

FIG. 11 illustrates another example method for enabling mediated reality and/or augmented reality and/or virtual reality. FIG. 11 illustrates an example where the mediated reality content 52 is shared from a first user 80A to a second user 80B.

At block 141 the first user 80A selects mediated reality content 52. The mediated reality content 52 may be content that has been used by the first user 80A in a first real space 10A. The mediated reality content 52 is stored with associated information 54 relating to the real space 10A in which the first user 80A used the mediated reality content 52.

At block 142 the first user 80A makes a user input indicating that they wish to share the mediated reality content 52 with a second user 80B. At block 143 the second user 80B makes a user input connecting to the mediated reality content 52. For instance the second user 80B may indicate that they wish to receive the mediated reality content 52.

At block 144 the mediated reality content 52 is provided to a mapping processing. The mediated reality content 52 may be provided with associated information about the first real space 10A. In some examples the information about the first real space could be obtained separately at block 145. At block 145 the mapping processing also obtains information 149 about the real space 10B in which the second user 80B is located.

The mapping processing may be performed by a processor 40. The mapping processing uses the information about the respective real spaces 10A, 10B to determine how the mediated reality content 52 should be adapted. Once the mediated reality content 52 has been adapted it is rendered by the apparatus 30 at block 146. For instance, it is displayed on a display 32 of the apparatus 30. At block 147 the first user 80A views the virtual visual scenes 22 and hears the audio scenes that are presented via a first apparatus 30 and the second user 80B views the virtual visual scenes 22 that are presented via a second apparatus 30. The first user 80A and the second user 80B may view the same virtual visual scenes 22 at the same time.

The methods as described with reference to FIGS. 11 to 18 may be performed by any suitable apparatus (e.g. apparatus 30, 400), computer program (e.g. computer program 46, 416) or system (e.g. system 100) such as those previously described or similar.

In the foregoing examples, reference has been made to a computer program or computer programs. A computer program, for example either of the computer programs 48 or a combination of the computer programs 48 may be configured to perform the methods.

Also as an example, an apparatus 30 may comprise: at least one processor 40; and at least one memory 46 including computer program code the at least one memory 46 and the computer program code configured to, with the at least one processor 40, cause the apparatus 30 at least to perform: storing 90 mediated reality content 52 and associated information relating to a first real space 10A in which the mediated reality content 52 has been displayed; selecting 92 the mediated reality content 52 for display in a second real space 10B; obtaining 94 information relating to the second real space 10B; and using the information relating to the first real space 10A and the information relating to the second real space 10B to adapt the mediated reality content 52 for display in the second real space 10B.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

It will be appreciated from the foregoing that the various methods described may be performed by an apparatus 30, for example an electronic apparatus 30.

The electronic apparatus 30, may in some examples be a part of an audio output device such as a head-mounted audio output device or a module for such an audio output device. The electronic apparatus 30, may in some examples additionally or alternatively be a part of a head-mounted apparatus comprising the rendering device(s) 32 that renders information to a user visually and/or aurally and/or haptically.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks, steps and processes illustrated in the FIGS. 7 to 11 may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here "module" refers to a unit or apparatus that excludes certain parts/components that would be added by an end manufacturer or a user. The controller 42 may, for example be a module. The apparatus may be a module. The rendering devices 32 may be a module or separate modules.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one" or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:
1. An apparatus comprising:
at least one processor; and
at least one memory including computer program code,
the at least one memory and the computer program code configured to, with the at least one processor, cause the apparatus to perform at least the following:

store mediated reality content and associated information relating to a first real space in which the mediated reality content has been displayed on a first device in the first real space;

select the stored mediated reality content from the first real space for display on a second device in a second real space;

obtain information relating to the second real space;

use the information relating to the first real space and the information relating to the second real space to generate an adaptation of the mediated reality content for display on the second device in the second real space, wherein using the information relating to the first real space and the second real space comprises comparing dimensions of the first real space and dimensions of the second real space and determining the adaptation of the mediated reality content for display on the second device in the second real space based on the comparison;

cause display to a first user, on the first device in the first real space, a template of the adaptation of the mediated reality content for display on the second device, wherein the template is displayed in a position, on the first device, that reflects a mapping of the determined adaptation of the mediated reality content to the second real space;

enable the first user in the first real space to manipulate the position of the template, such that the mapping of the adaptation of the mediated reality content for display on the second device is updated based on user manipulation of the template; and responsive to input from the first user, cause display of the adaptation of the mediated reality content to a second user on the second device in the second real space.

2. The apparatus of claim 1, wherein the adaptation of the mediated reality content enables a user to move within a virtual visual space in both the first real space and the second real space.

3. The apparatus of claim 1, wherein the adaptation of the mediated reality content enables a virtual visual scene that has been viewed by the first user in the first real space to also be viewed by the second user in the second real space.

4. The apparatus of claim 1, wherein the adaptation of the mediated reality content controls the perceived position of virtual visual objects within the second real space so that the second user in the second real space can move to the same positions relative to the virtual visual objects as the first user in the first real space.

5. The apparatus of claim 1, wherein generating the adaptation of the mediated reality content comprises aligning a virtual visual space that has been displayed on the first device in the first real space with the second real space, wherein the virtual visual space is aligned according to the mapping of the determined adaptation of the mediated reality content to the second real space.

6. The apparatus of claim 1, wherein generating the adaptation of the mediated reality content comprises at least one of; moving or rotating, within the second real space, the position at which the mediated reality content is displayed on the second device in the second real space.

7. The apparatus of claim 1, wherein generating the adaptation of the mediated reality content comprises moving at least one virtual visual object within a virtual visual space.

8. The apparatus of claim 1, wherein generating the adaptation of the mediated reality content comprises changing the scale of at least one of; a virtual visual space of the mediated reality content or one or more virtual visual objects within the mediated reality content.

9. The apparatus of claim 1, wherein the mediated reality content is displayed to a first user in the first real space and an adaptation of the mediated reality content is generated before it is shared to a second user where the second user is in a second real space.

10. The apparatus of claim 1, further caused to enable user control of the adaptation of the mediated reality content, wherein the user control of the adaptation of the mediated reality content enables a user to select at least one virtual visual object so that the virtual visual object is displayed on both the first device in the first real space or the second device in the second real space.

11. The apparatus of claim 1, wherein the associated information stored with the mediated reality content comprises information relating to at least one of; the size of the first real space, the shape of the first real space, the position of the user within the first real space when the mediated reality content was displayed, the orientation of the user within the first real space when the mediated reality content was displayed or the position of objects within the first real space when the mediated reality content was displayed.

12. The apparatus of claim 1, wherein using the information relating to the first real space and the second real space further comprises comparing the location of real objects within the first real space and the second real space and controlling the position at which virtual visual objects are displayed in the second real space to enable a user to view the virtual visual object from the same relative positions in both the first real space and the second real space.

13. A method comprising:

storing mediated reality content and associated information relating to a first real space in which the mediated reality content has been displayed on a first device in the first real space;

selecting the stored mediated reality content from the first real space for display on a second device in a second real space;

obtaining information relating to the second real space;

using the information relating to the first real space and the information relating to the second real space to generate an adaptation of the mediated reality content for display on the second device in the second real space, wherein using the information relating to the first real space and the second real space comprises comparing dimensions of the first real space and dimensions of the second real space and determining the adaptation of the mediated reality content for display on the second device in the second real space based on the comparison;

causing display to a first user, on the first device in the first real space, a template of the adaptation of the mediated reality content for display on the second device, wherein the template is displayed in a position, on the first device, that reflects a mapping of the determined adaptation of the mediated reality content to the second real space;

enabling the first user in the first real space to manipulate the position of the template, such that the mapping of the adaptation of the mediated reality content for display on the second device is updated based on user manipulation of the template; and responsive to input from the first user, causing display of the adaptation of the mediated reality content to a second user on the second device in the second real space.

14. The method of claim 13, wherein the adaptation of the mediated reality content enables a user to move within a virtual visual space in both the first real space and the second real space.

15. The method of claim 13, wherein the adaptation of the mediated reality content enables a virtual visual scene that has been viewed by the first user in the first real space to also be viewed by the second user in the second real space.

16. The method of claim 13, wherein the adaptation of the mediated reality content controls the perceived position of virtual visual objects within the second real space so that the second user in the second real space can move to the same positions relative to the virtual visual objects as the first user in the first real space.

17. The method of claim 13, wherein generating the adaptation of the mediated reality content comprises aligning a virtual visual space that has been displayed on the first device in the first real space with the second real space, wherein the virtual visual space is aligned according to the mapping of the determined adaptation of the mediated reality content to the second real space.

18. A non-transitory computer readable medium comprising program instructions stored thereon for performing at least the following:

store mediated reality content and associated information relating to a first real space in which the mediated reality content has been displayed on a first device in the first real space;

select the stored mediated reality content from the first real space for display on a second device in a second real space;

obtain information relating to the second real space;

use the information relating to the first real space and the information relating to the second real space to generate an adaptation of the mediated reality content for display on the second device in the second real space, wherein using the information relating to the first real space and the second real space comprises comparing dimensions of the first real space and dimensions of the second real space and determining the adaptation of the mediated reality content for display on the second device in the second real space based on the comparison;

cause display to a first user, on the first device in the first real space, a template of the adaptation of the mediated reality content for display on the second device, wherein the template is displayed in a position, on the first device, that reflects a mapping of the determined adaptation of the mediated reality content to the second real space;

enable the first user in the first real space to manipulate the position of the template, such that the mapping of the adaptation of the mediated reality content for display on the second device is updated based on user manipulation of the template; and responsive to input from the first user, cause display of the adaptation of the mediated reality content to a second user on the second device in the second real space.

* * * * *